(12) United States Patent
Nishimura et al.

(10) Patent No.: US 7,275,485 B2
(45) Date of Patent: Oct. 2, 2007

(54) SQUIB

(75) Inventors: Junichi Nishimura, Shimotsuga-gun (JP); Hiromi Aida, Kanuma (JP); Kazuo Matsuda, Shioya-gun (JP); Kazutaka Saito, Kawachi-gun (JP); Etsuya Miyake, Utsunomiya (JP); Yoshitaka Suzuki, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 282 days.

(21) Appl. No.: 11/006,201

(22) Filed: Dec. 6, 2004

(65) Prior Publication Data

US 2005/0121893 A1    Jun. 9, 2005

(30) Foreign Application Priority Data

Dec. 8, 2003    (JP)    ............... 2003-408906

(51) Int. Cl.
   *F42B 3/182*    (2006.01)
(52) U.S. Cl. ............... 102/202.3; 102/202.9; 102/202.14
(58) Field of Classification Search ............ 102/202.5, 102/202.7, 202.8, 202.9, 202.11, 202.14, 102/202.3

See application file for complete search history.

(56) References Cited

U.S. PATENT DOCUMENTS

| | | | |
|---|---|---|---|
| 5,847,309 A | 12/1998 | Baginski | |
| 5,905,226 A | 5/1999 | Baginski | |
| 6,192,802 B1 | 2/2001 | Baginski | |
| 6,341,562 B1 | 1/2002 | Brisighella | |

2002/0166473 A1* 11/2002 Goernig et al. .......... 102/202.5

FOREIGN PATENT DOCUMENTS

| | | |
|---|---|---|
| DE | 199 51 720 A1 | 12/2000 |
| DE | 102 11 347 A1 | 10/2003 |
| DE | 102 11 348 A1 | 10/2003 |
| JP | 57-142498 | 9/1982 |
| JP | 10154992 | 6/1998 |
| JP | 2000124932 | 4/2000 |
| JP | 2000241098 | 9/2000 |
| JP | 2003-285715 | 10/2003 |
| JP | 2004-203294 | 7/2004 |
| WO | WO 02/01078 A1 | 1/2002 |

* cited by examiner

*Primary Examiner*—Stephen M. Johnson
(74) *Attorney, Agent, or Firm*—Carrier, Blackman & Associates, P.C.; Joseph P. Carrier; William D. Blackman (57) ABSTRACT

A squib associated with a supplemental restraint system includes an igniting agent positioned above a first pin that is a connecting terminal providing a connection with a two-wire system bus wire, which is an external signal wire, and above a header that is provided with a second pin that is a connecting terminal. The squib also includes an IC substrate that controls communications and ignitions, and is positioned above the igniting agent, an ignition element between the igniting agent and the IC substrate, and joining portions provided in two locations bridging the igniting agent so as to connect the IC substrate with the first pin and the header. The IC substrate, the igniting agent, the pin, and the header are covered by a circular cylinder shaped cap whose top portion is closed off. Furthermore, these are formed integrally by being covered by a resin mold that is made to extend across the portions of the pins using a molding process. When the squib is operated it does not electrically affect the external signal wire.

20 Claims, 7 Drawing Sheets

SQUIB

BACKGROUND OF THE INVENTION

1. Field of the Invention

Priority is claimed from Japanese Patent Application No. 2003-408906, filed Dec. 8, 2004, the contents of which are incorporated herein by reference.

The present invention relates to a squib (ignition apparatus) of an occupant protection apparatus that is mounted in a vehicle or the like.

2. Description of Related Art

In recent years, occupant protection apparatuses that use supplemental restraint systems such as airbags and pretensioners in order to protect an occupant of a vehicle or the like have become widespread. In these occupant protection apparatuses, a supplemental restraint system is placed in a required location, and when an impact acts on a vehicle, this impact is detected by a sensor and the supplemental restraint system protects the occupant by temporarily restraining the occupant such that the occupant does not collide with an object in the vehicle interior.

Conventionally, in order to reduce the number of supplemental restraint systems placed in a vehicle, a connection between a control unit that controls the supplemental restraint systems and a squib that operates the supplemental restraint systems has been, for example, a simple 1 to 1 connection (i.e., a peer to peer connection). However, recently, due to the placement of supplemental restraint systems in various locations of a vehicle there has been a trend towards the number of supplemental restraint systems increasing. As a result, there have been demands for the connecting wires (i.e., harnesses) that connect control units and control units with squibs of supplemental restraint systems to be reduced as much as possible. Therefore, a method has been proposed (for example, in Japanese Patent Application Laid-Open (JP-A) Nos. 10-154992 and 2000-1249321) in which a connection between a control unit and a squib of a supplemental restraint system is made using a bus wire that is capable of transmitting power and control signals, and a plurality of supplemental restraint systems that are connected to the bus wire are controlled by a single control unit using ignition control based on communication that specifies the relevant squib.

On the other hand, in order for a squib to be connected to a bus wire and receive ignition control based on communication from a control unit, it is necessary for the squib side to be provided with a communication circuit that is used to communicate with the control unit, and an ignition circuit that supplies power to an ignition element in order to ignite an explosive that causes the supplemental restraint system to operate. In this squib, a control IC that controls communication and ignition is placed between the ignition element and an external connection terminal that is used to connect the squib to the bus wire (see, for example, Japanese Patent No. 3294582).

However, in a conventional method of connecting a control unit to a squib for a supplemental restraint system using a bus wire, although it is possible to control a plurality of supplemental restraint systems efficiently using a single control unit, the only connecting wire that transmits power or control signals to the plurality of supplemental restraint systems is the bus wire. Therefore, the problem arises that the transmission of power or control signals via the bus wire needs to be extremely reliable. In particular, when the squib is provided with a communication circuit and an ignition circuit, as is the case with a conventional squib, sufficient consideration needs to be given to ensuring that the bus wire is not electrically affected by the squib that is provided in the supplemental restraint system being operated, and the problem arises that the reliability of the bus wire needs to be increased still further.

The present invention was conceived in view of the above described circumstances and it is an object thereof to provide a squib that, when causing a supplemental restraint system to operate, does not electrically affect an external signal wire that supplies power and control signals.

SUMMARY OF THE INVENTION

In order to solve the above problems, according to the first aspect of the present invention there is provided a squib for an occupant protection apparatus that, based on an ignition command signal received from an external signal line (for example, the bus wire 3 of the embodiments described below), ignites an explosive (for example, the igniting agent 53 of the embodiments described below) so as to cause a supplemental restraint system to be operated, the squib comprising: an ignition device (for example, the ignition element 30 of the embodiments described below) that ignites the explosive; a communication/ignition control section (for example, the integrated circuit substrate (IC substrate) 54 of the embodiments described below) that receives the ignition command signal, and that controls an igniting of the explosive by the ignition device; and a connecting terminal (for example, the pins 51*a*, 51*b* or 59*a* of the embodiments described below) that connects the communication/ignition control section to the external signal line, wherein when the explosive is being ignited by the ignition device, the communication/ignition control section is separated from the connecting terminal by at least one of pressure and heat generated from the explosive.

In the squib provided with the above described structure, when a supplemental restraint system is operated using an explosive, because the connection between the external signal wire and the communication/ignition control section is broken as a result of the connecting terminal, which connects the external signal wire to the communication/ignition control section, being separated from the communication/ignition control section by the pressure or heat generated from the ignited explosive, even if the communication/ignition control section is damaged by the pressure or heat that is generated from the ignited explosive, it is possible to prevent any electrical effects from being generated on the external signal wire side that had been connected to the communication/ignition control section.

According to the squib of the first aspect of the present invention, because the connection between the external signal wire and the communication/ignition control section is broken by the pressure or heat generated from the ignited explosive, even if the communication/ignition control section is damaged by the pressure or heat that is generated from the explosive, it is possible to prevent any electrical effects from being generated on the bus wire side that had been connected to the communication/ignition control section. Accordingly, a squib that is provided in the supplemental restraint system being operated does not electrically affect the external signal wire that supplies power and control signals. Consequently, the effect is obtained that it is possible to achieve a squib that further improves the reliability of the external signal wire.

DETAILED DESCRIPTION OF THE INVENTION

While present preferred embodiments of the invention are described and illustrated herein, it should be understood that these are exemplary of the invention and are not to be considered as limiting. Additions, omissions, substitutions, and other modifications can be made without departing from the spirit or scope of the present invention. Accordingly, the invention is not to be considered as limited by the description of the embodiments herein, and is only limited by the scope of the appended claims.

Embodiments of the present invention will now be described with reference made to the drawings.

FIRST EMBODIMENT (Overall Structure)

Figure 1:
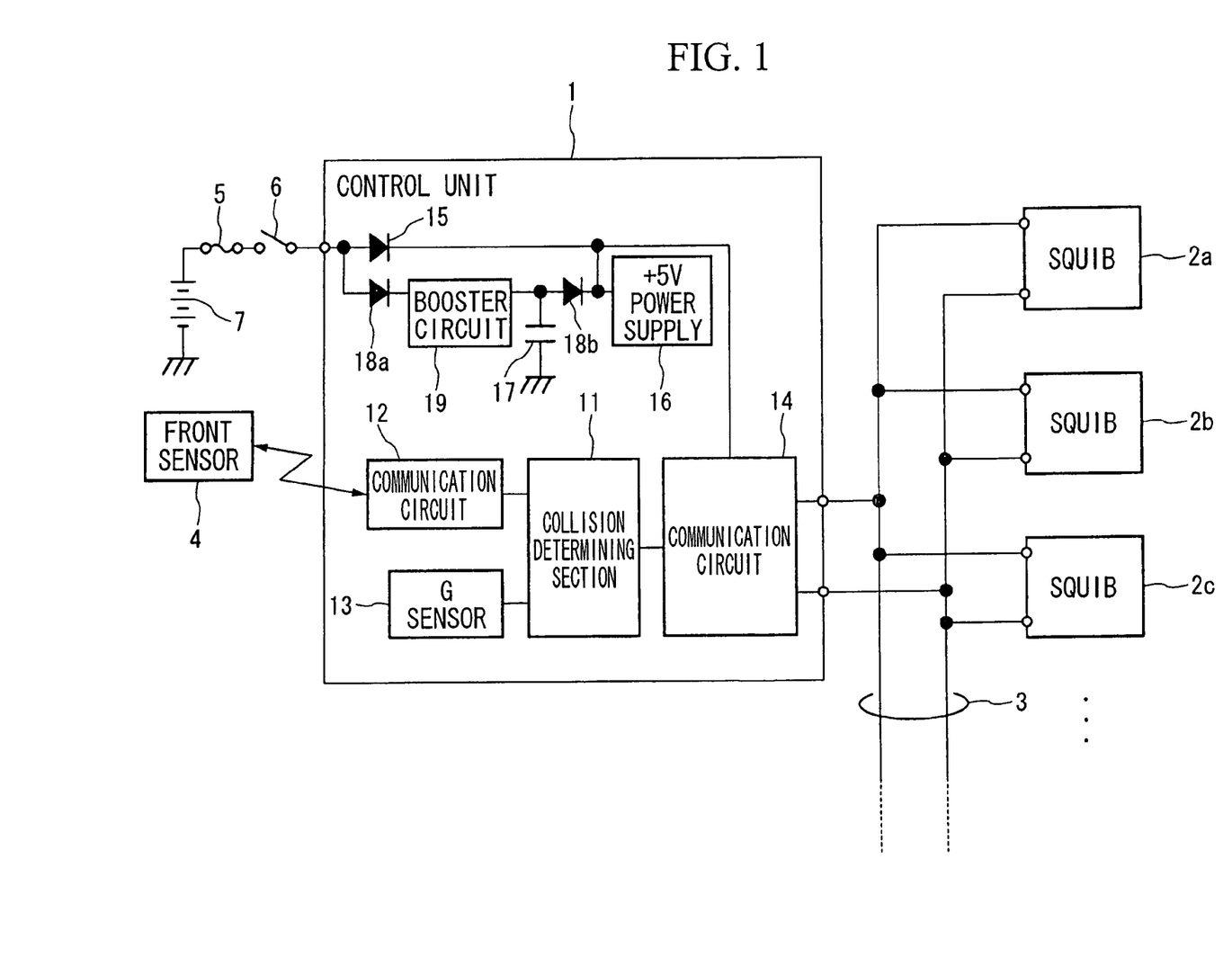
FIG. 1 is a block diagram showing an outline of an ignition system of an occupant protection apparatus that is provided with the squib according to the first embodiment of the present invention.

FIG. 1 is a block diagram showing an outline of an ignition system of an occupant protection apparatus that is provided with the squib (ignition apparatus) according to the first embodiment of the present invention. Note that the occupant protection apparatus that is provided with the squib of the present embodiment is particularly useful if it is used by being mounted in a vehicle such as an automobile. As an example, a description is given of when the occupant protection apparatus is mounted in an automobile.

In FIG. 1, a control unit 1 is a control device that forms the center of an occupant protection apparatus that protects an occupant of a vehicle from an impact acting on the vehicle. Squibs 2a, 2b, 2c, . . . of a plurality of supplemental restraint systems (not shown) that are provided in suitable locations in the vehicle in order to protect an occupant are provided 1 to 1 for the supplemental restraint systems, and are connected in parallel to the control unit 1 using, for example, an unbalanced type of bus line 3 in which one of two pairs of wires is grounded. Note that the squibs 2a, 2b, 2c, . . . are apparatuses that operate the supplemental restraint systems using an igniting agent (i.e., an explosive that lights a gas generating agent of the supplemental restraint system), and an igniting agent (i.e., the igniting agent 53 described below) is incorporated inside each. The squibs 2a, 2b, 2c, . . . operate the supplemental restraint systems by igniting the igniting agent after receiving command signals (i.e., ignition command instructions) that are sent to the designated communication addresses of the squibs 2a, 2b, 2c, . . . from the control unit 1.

A collision determining section 11 in the form of a central processing unit (CPU) is provided in the control unit 1. The collision determining section 11 determines whether or not an impact that requires the occupant protection apparatuses to be operated has acted on the vehicle due to the vehicle colliding with another object based on output signals from a front sensor 4 that is provided in a front portion of the vehicle and is connected via a communication circuit 12 to the collision determining section 11 and that detects a rate of acceleration due to a deformation of the front portion of the vehicle, and based on output signals from a G sensor 13 that is provided in the control unit 1 and detects the rate of acceleration of the vehicle.

On the other hand, a communication circuit 14 that supplies power (i.e., electrical energy) to the squibs 2a, 2b, 2c, . . . via the bus wire 3 and that performs control signal communication with the squibs 2a, 2b, 2c, . . . by designating the communication addresses thereof is provided in the control unit 1. When the collision determining section 11 determines that an impact that requires the occupant protection apparatuses to be operated has acted on the vehicle due to the vehicle colliding with another object, an ignition command signal (i.e., an ignition command instruction) is sent by the communication circuit 14 via the bus line 3 to the squibs 2a, 2b, 2c, . . . in order to operate a supplemental restraint system (not shown).

A vehicle mounted battery 7 that stores power used by the vehicle is also connected to the control unit 1 via an ignition switch (IG·SW) 6 and a fuse 5 that is used to prevent current surges. Power from the vehicle mounted battery 7 that is input via a protective diode 15 that prevents current counter flow is supplied to a +5 v power supply 16 that creates a power supply for the CPU and the like that constitute the collision determining section 11. In addition, this power is supplied to the communication circuit 14 that supplies power to the squibs 2a, 2b, 2c, . . . Furthermore, the control unit 1 is also provided with a backup condenser 17 that backs up the power supply by storing power, protective diodes 18a and 18b that charge the backup condenser 17, and booster circuit 19 such that the control unit I operates for a fixed time even if the supply of power from the vehicle mounted battery 7 is stopped.

(Bus Wire Signal Specifications)

Figure 2:
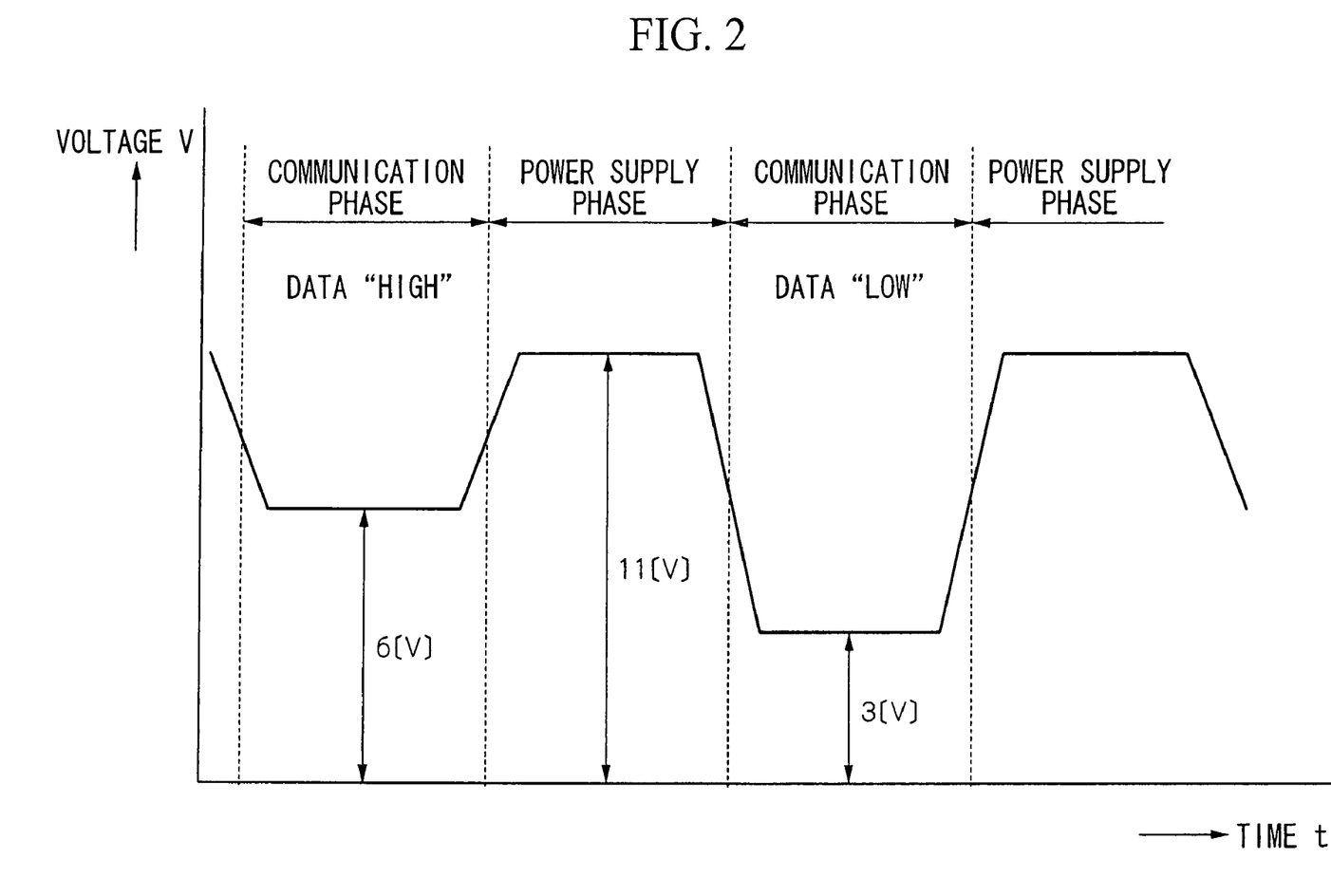
FIG. 2 is a view showing specifications of signals that are transmitted and received via a bus wire in the first embodiment.

Here, a description will be given of the communication of control signals and power supply via the bus 3 between the communication circuit 14 and the squibs 2a, 2b, 2c, . . . FIG. 2 is a view showing specifications of signals that are transmitted and received by the bus wire 3 between the communication circuit 14 and the squibs 2a, 2b, 2c, . . . , with the horizontal axis taken as time t and the vertical axis taken as voltage V. As is shown in FIG. 2, the bus wire 3 is controlled by the control unit 1 so as to alternatingly repeat a communication phase that designates communication addresses and then transmits and receives control signals between the control unit 1 and the squibs 2a, 2b, 2c, . . . , and a power supply phase that supplies power from the control unit 1 to the squibs 2a, 2b, 2c , . . . . Specifically, for example, in a communication phase, data "High" (=1) is shown when a potential difference between two wires constituting the bus wire 3 is 6 V, and, in the same way, data "Low" (=0) is shown when the potential difference between the two wires is 3 V. Moreover, in power supply phase, power when the potential difference between the two wires is 11 V is supplied from the control unit 1 to the squibs 2a, 2b, 2c, . . . .

(Details of Squib)

Figure 3:
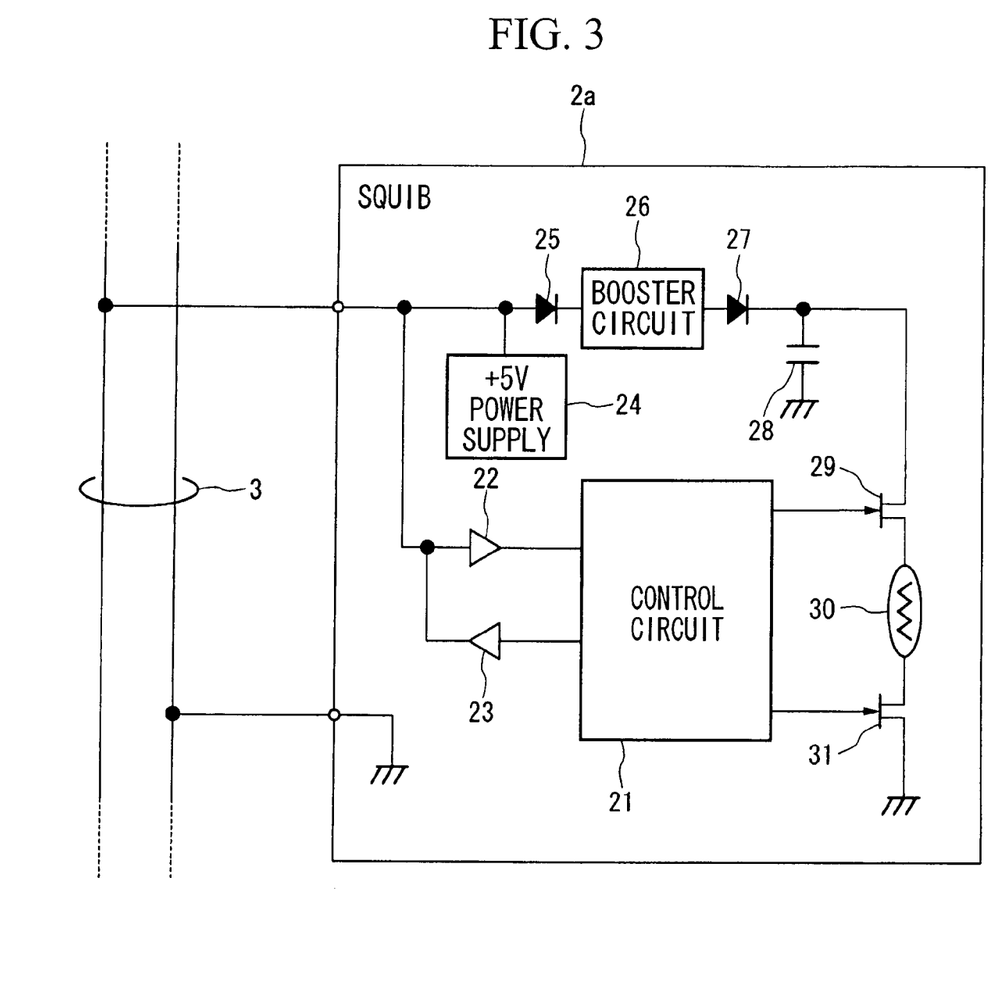
FIG. 3 is a block diagram showing details of the sciuib of the first embodiment.

FIG. 3 is a block diagram showing details of the squib of the present embodiment, and shows the squib 2a in detail as an example. Note that the other squibs 2b, 2c, . . . that are connected to the bus wire 3 all have the same apparatus structure as the squib 2a.

In FIG. 3, a control circuit 21 that executes ignition control based on a diagnosis of communications by the bus wire 3 and on instructions from the control unit 1 is provided in the squib 2a. Control signals (i.e., commands) are input into the control circuit 21 from the bus wire 3 via a reception buffer 22, and response signals (i.e., responses) responding to the control signals are output from the control circuit 21 to the bus wire 3 via a transmission buffer 23. Power supplied from the bus wire 3 is supplied to a +5V power supply 24 that creates a power supply for the control circuit 21 and the like. Power from the bus wire 3 is also supplied via a protective diode 25 to a booster circuit 26 that generates the power required for the squib 2a to ignite the igniting agent and operate the supplemental restraint system.

A condenser 28 is connected via a protective diode 27 to an output of the booster circuit 26. The power that is boosted by the booster circuit 26 and is required for the squib 2a to ignite the igniting agent and operate the supplemental restraint system can be stored in the condenser 28. Furthermore, in parallel with the condenser 28, a series circuit made up of a switching element 29, an ignition element 30 that ignites the igniting agent incorporated in the squib 2a, and a switching element 31 is connected to an output (i.e., a cathode terminal) of the protective diode 27. Specifically, one terminal of the ignition element 30 is connected via the switching element 29 to the output of the protective diode 27, while the other terminal of the ignition element 30 is grounded via the switching element 31. Control terminals that control the conduction and cutoff of the switching element 29 and the switching element 31 are both connected to the control circuit 21.

As a result, in an ignition system that is provided with the squib of the present embodiment, if the control unit 1 supplies power to the bus wire 3 and transmits a charge power command, then because the power required, for example, for the ignition element 30 to ignite the igniting agent and operate the supplemental restraint system is stored in the condenser 28 of the squib 2a, if, in this state, the control unit 1 sends an ignition execute signal (i.e., an ignition execute command) to the squib 2a, the control circuit 21 of the squib 2a is able to conduct the switching element 29 and the switching element 31 such that power stored in the condenser 28 is supplied to the switching element 30, resulting in the igniting agent stored in the squib 2 exploding and the supplemental restraint system thereby being operated.

(Physical Layout Structure of the Squib)

Figure 4:
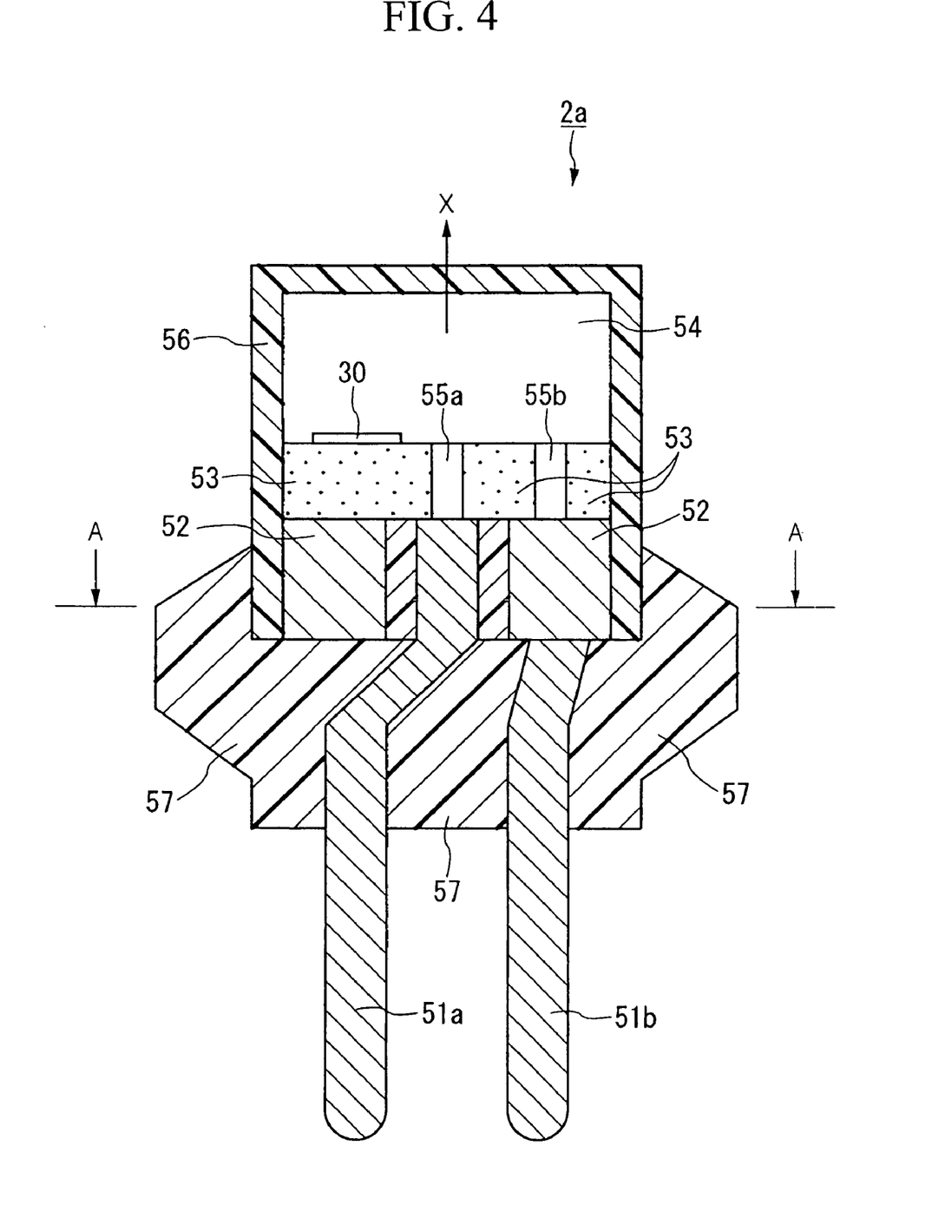
FIG. 4 is a cross-sectional view in the vertical direction of a squib showing the physical layout structure of the squib of the first embodiment.

A description will now be given of the physical layout structure of the squib of the present embodiment with reference made to the drawings. FIG. 4 shows the physical layout structure of the squib of the present embodiment, and is a vertical cross-sectional view of a squib. The squib 2a is shown in detail as an example. Note that the other squibs 2b, 2c, . . . that are connected to the bus wire 3 all have the same physical layout structure as the squib 2a.

Figure 5:
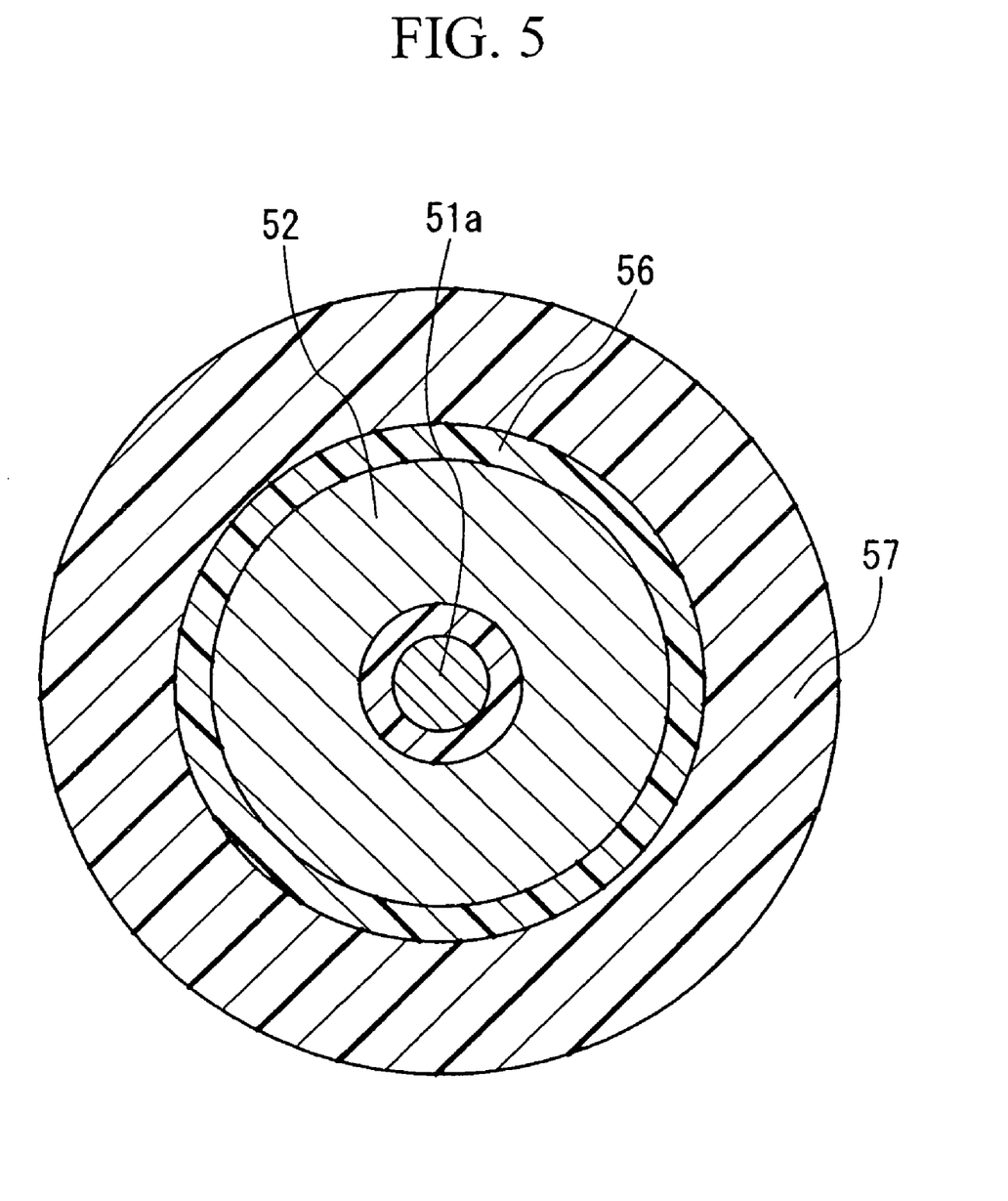
FIG. 5 is a cross-sectional view in the horizontal direction of the squib of the first embodiment, being taken along line A-A in FIG. 4.

Specifically, as is shown in FIG. 4, in the squib 2a, an igniting agent 53 that ignites a gas generating agent of a supplemental restraint system is positioned above a pin 51 *a*, which is a connecting terminal that is provided in order to make a connection with a two-wire system bus wire 3, which is an external signal wire, and above a header 52 that is provided with a pin 51*b*, which is a connecting terminal. In addition, an IC substrate 54 on which are mounted the aforementioned control circuit 21, the reception buffer 22, the transmission buffer 23, the +5V power supply 24, the protective diode 25, the booster circuit 26, the protective diode 27, the condenser 28, the switching element 29, the ignition element 30, and the switching element 31 is positioned above the igniting agent 53. Note that the pin 51*b* and the header 52 are formed from a melting material. In addition, although in the cross-sectional view taken in the vertical direction shown in FIG. 4 they appear to be in two different locations, in actual fact, the header 52 is positioned so as to surround the pin 51*a*, as is shown in the cross-sectional view of FIG. 5 taken in the horizontal direction along the line A-A shown in FIG. 4. Furthermore, the space between the pin 51*a* and the header 52 is filled with a non-conductive material such as glass in order to fix the pin 51*a* in position.

Between the igniting agent 53 and the IC substrate 54 is provided the ignition element 30 that is connected to the switching element 29 and the switching element 31. In addition, joining portions 55*a* and 55*b* are provided in two locations bridging the igniting agent 53 so as to connect the IC substrate 54 with the pin 51*a* and the header 52.

The IC substrate 54, the igniting agent 53, the pin 51*a*, and the header 52 are covered by a circular cylinder shaped cap 56 whose top portion is closed off.

Furthermore, the IC substrate 54, the igniting agent 53, the pin 51*a*, and the header 52 that are covered by the cap 56 are formed integrally by being covered by a resin mold 57 that is made to extend across the portions of the pins 51*a* and 51*b* using a molding process. Note that, in the above description, the materials used for each portion are merely examples thereof and a variety of modifications can be employed such as, for example, using a cap 56 formed from metal.

As a result, if the ignition element 30 is energized and generates heat so as to ignite the igniting agent 53, the supplemental restraint system is operated and the IC substrate 54 is blown in the direction of the top surface (i.e., in the X direction shown in FIG. 4) of the squib 2a by the pressure that is generated from the ignited igniting agent 53 and is separated from the top surface of the squib 2a. Accordingly, either the joining portions 55*a* and 55*b* in the two locations that connect the IC substrate 54 with the pin 51*a* and the header 52 are cut, or the joining portions 55*a* and 55*b* in the two locations are melted by the heat generated from the ignited igniting agent 53. As a result of either of these, the connections between the pins 51*a* and 51*b* that are connected to the bus 3 and the IC substrate 54 are cut. Therefore, even if the IC substrate 54 is damaged by the pressure or heat that is generated from the ignited igniting agent 53, it is possible to prevent any electrical effects from being generated on the bus wire 3 side that had been connected to the IC substrate 54.

Note that the bus wire 3 described in the above embodiment may also be, for example, a non-balanced type of bus wire in which neither of two pairs of wires are grounded.

As has been described above, according to the squib of the present embodiment, when a supplemental restraint system is operated by igniting an igniting agent 53, by separating the IC substrate 54 from pins 51a and 51b that are used to connect the IC bus substrate 54 with the bus wire 3 using the pressure or heat generated from the ignited igniting agent 53, the connection between the bus wire 3 and the IC substrate 54 is broken. As a result, even if the IC substrate 54 is damaged by the pressure or heat that is generated from the ignited igniting agent 53, it is possible to prevent any electrical effects from being generated in the bus wire 3 that had been connected to the IC substrate 54.

Accordingly, a squib that is provided in the supplemental restraint system being operated does not electrically affect the bus wire 3, which supplies power and control signals. Consequently, the effect is obtained that it is possible to achieve a squib that further improves the reliability of the bus wire 3.

SECOND EMBODIMENT

Next, the squib of the second embodiment of the present invention will be described.

The squib of the second embodiment differs from the squib described in the first embodiment only in the physical layout structure of the component elements constituting the squib. Accordingly, the structure of the ignition system of the occupant protection apparatus in which the squib of the present embodiment is provided, as well as the circuit structure (i.e., the apparatus structure) of the squib of the present embodiment and the signal specifications of the bus wire are identical with the structure of the ignition system as well as the circuit structure (i.e., the apparatus structure) of the squib and the signal specifications of the bus wire of the first embodiment. Therefore a description thereof is omitted. Here, only the physical layout structure of the component elements that form the squib (ignition apparatus) of the present embodiment is described.

(Physical Layout Structure of the Squib)

Figure 6:
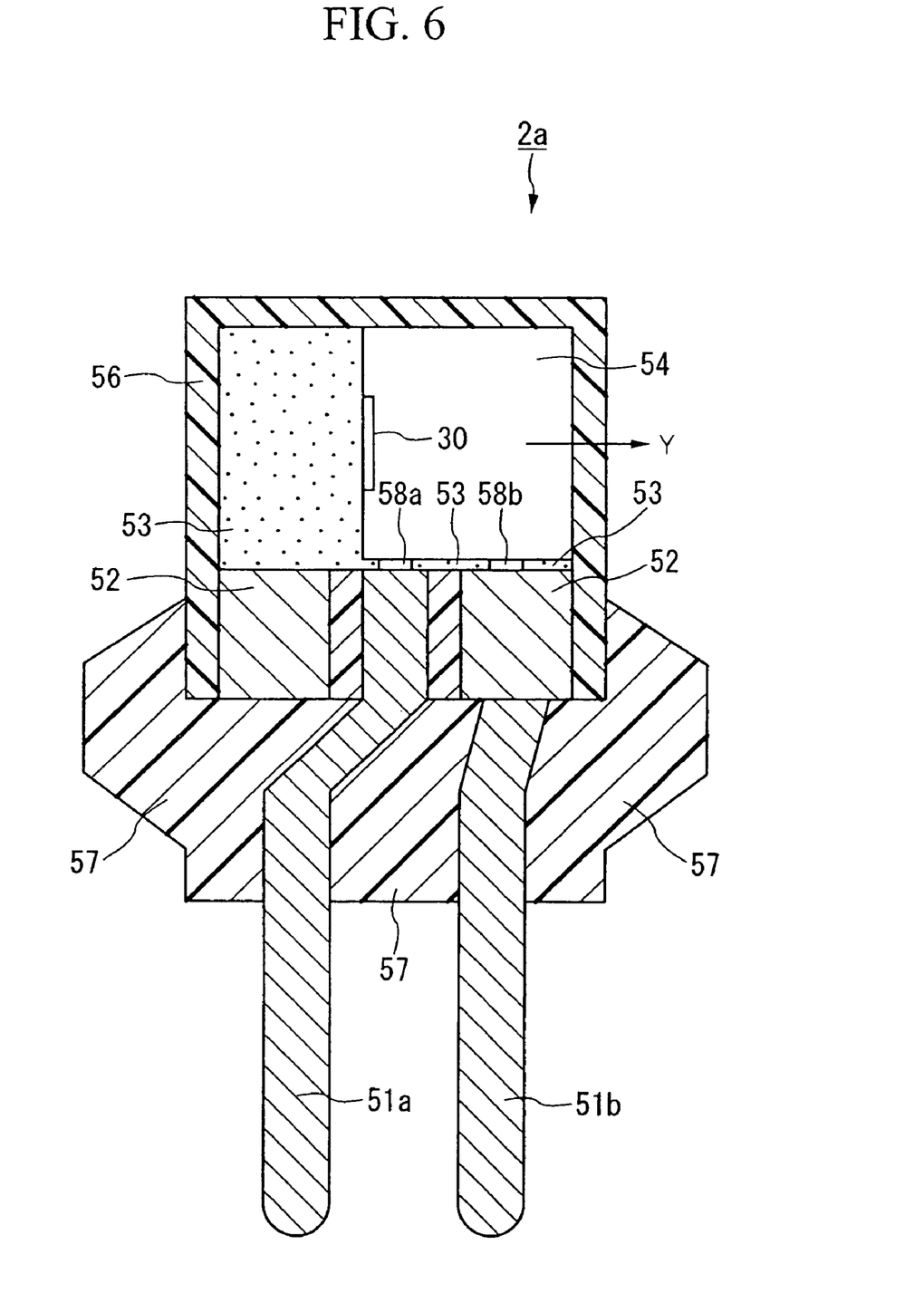
FIG. 6 is a cross-sectional view in the vertical direction of a squib showing the physical layout structure of the squib of a second embodiment of the present invention.

FIG. 6 shows the physical layout structure of the squib of the present embodiment, and is a vertical cross-sectional view of a squib. In the same way as in the first embodiment, the squib 2a is shown in detail as an example.

As is shown in FIG. 6, the physical layout structure of the squib of the present embodiment is the same as that of the squib of the first embodiment in that the igniting agent 53 and the IC substrate 54 are placed above the pin 51a and the header 52, however, the placement of the igniting agent 53 and the IC substrate 54 is different from that of the squib of the first embodiment.

Specifically, the igniting agent 53 and the IC substrate 54 that have been partitioned from each other are placed respectively so as to cover top surfaces of a pin 51a, which is a connecting terminal that is provided in order to make a connection with a two-wire system bus wire 3, which is an external signal wire, and of a header 52 that is provided with a pin 51b, which is a connecting terminal.

Between the igniting agent 53 and the IC substrate 54 is provided the ignition element 30 that is connected to the switching element 29 and the switching element 31. In addition, joining portions 58a and 58b are provided in two locations bridging the igniting agent 53, a part of which is inserted into the gap between the IC substrate 54 and the pin 51a and header 52, so as to connect the IC substrate 54 with the pin 51a and the header 52.

The IC substrate 54, the igniting agent 53, the pin 51a, and the header 52 are covered by a circular cylinder shaped cap 56 whose top portion is closed off. Furthermore, the IC substrate 54, the igniting agent 53, the pin 51a, and the header 52 that are covered by the cap 56 are formed integrally by being covered by a resin mold 57 that is made to extend across the portions of the pins 51a and 51b using a molding process. Note that, in the above description, the materials used for each portion are merely examples thereof and a variety of modifications can be employed such as, for example, using a cap 56 formed from metal.

As a result, if the ignition element 30 is energized and generates heat so as to ignite the igniting agent 53, the supplemental restraint system is operated and the IC substrate 54 is blown in the direction of the circumferential surface or the direction of the side surface (i.e., in the Y direction shown in FIG. 6) of the squib 2a by the pressure that is generated from the ignited igniting agent 53 and is separated from the circumferential surface or side surface of the squib 2a. Accordingly, either the joining portions 58a and 58b in the two locations that connect the IC substrate 54 with the pin 51a and the header 52 are cut, or the joining portions 58a and 58b in the two locations are melted by the heat generated from the ignited igniting agent 53. As a result of either of these, the connections between the pins 51a and 51b that are connected to the bus 3 and the IC substrate 54 are cut. Therefore, even if the IC substrate 54 is damaged by the pressure or heat that is generated from the ignited igniting agent 53, it is possible to prevent any electrical effects from being generated on the bus wire 3 side that had been connected to the IC substrate 54.

As has been described above, according to the squib of the present embodiment, in the same way as in the first embodiment, when a supplemental restraint system is operated by igniting an igniting agent 53, because the connection between the bus wire 3 and the IC substrate 54 is broken, even if the IC substrate 54 is damaged by the pressure or heat that is generated from the ignited igniting agent 53, it is possible to prevent any electrical effects from being generated in the bus wire 3 that had been connected to the IC substrate 54.

Accordingly, a squib that is provided in the supplemental restraint system being operated does not electrically affect the bus wire 3, which supplies power and control signals. Consequently, the effect is obtained that it is possible to achieve a squib that further improves the reliability of the bus wire 3.

THIRD EMBODIMENT

Next, the squib of the third embodiment of the present invention will be described.

The squib of the present embodiment differs from the squib described in the first and second embodiments only in the physical layout structure of the component elements constituting the squib. Accordingly, the structure of the ignition system of the occupant protection apparatus in which the squib of the present embodiment is provided, as well as the circuit structure (i.e., the apparatus structure) of the squib of the present embodiment are identical with the structure of the ignition system as well as the circuit structure (i.e., the apparatus structure) of the squib of the first and second embodiments. Therefore, a description thereof is omitted. Here, only the physical layout structure of the component elements that form the squib of the present embodiment is described.

(Physical Layout Structure of the Squib)

Figure 7:
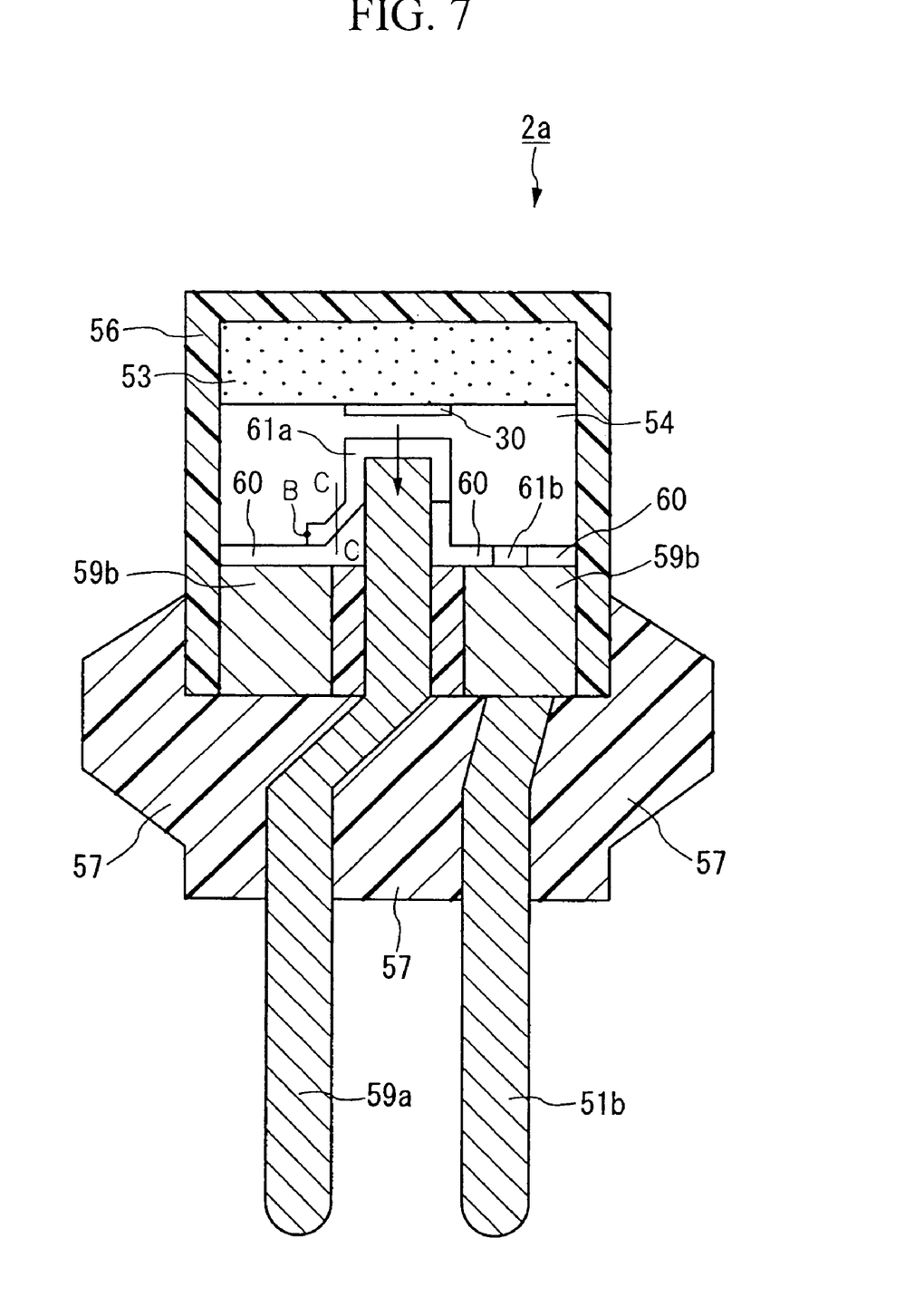
FIG. 7 is a cross-sectional view in the vertical direction of a squib showing the physical layout structure of the squib of a third embodiment of the present invention.

FIG. 7 is a vertical cross-sectional view of a squib showing the physical layout structure of the squib of the present embodiment, and in the same way as in the first and second embodiments, the squib 2a is shown in detail as an example.

As is shown in FIG. 7, the physical layout structure of the squib of the present embodiment is the same as that of the first and second embodiments in the placement of the igniting agent 53 and the IC substrate 54 above the header, however, the placement of the igniting agent 53 and the IC substrate 54 and the configuration of the pin that is a connecting terminal that is provided in order to make a connection with the bus wire 3, which is an external signal wire, are different from those of the squibs of the first and second embodiments.

Specifically, a pin 59a, which is a connecting terminal that is provided in order to make a connection with the two-wire system bus wire 3, which is an external signal wire, extends (i.e., protrudes) beyond it's periphery, and the IC substrate 54 is placed on top of the pin 59a, which extends (i.e., protrudes) beyond the periphery, and a header 59b that is provided with the pin 51b, which is a connecting terminal, and that surrounds the periphery of the pin 59a. The IC substrate 54 is positioned so as to surround the pin 59a leaving a uniform space (i.e., gap) 60. Furthermore, the igniting agent 53 is placed above the IC substrate 54. Note that the pin 51b and the header 59b are formed from a melting material. In addition, the space between the pin 59a and the header 59b is filled with a non-conductive material such as glass in order to fix the pin 59a in position.

Between the igniting agent 53 and the IC substrate 54 is provided the ignition element 30 that is connected to the switching element 29 and the switching element 31. In addition, a joining portion 61a that connects the IC substrate 54 with the pin 59a and a joining portion 61b that connects the IC substrate 54 with the header 59b are provided bridging the space 60. Looking at the joining portion 61a in more detail, the joining portion 61 is positioned so as to surround the extending (i.e., protruding) pin 59a. Note that the joining portion 61a is only connected to the IC substrate 54 at the point B shown in FIG. 7, and the remaining portions thereof are insulated from the IC substrate 54.

The IC substrate 54, the igniting agent 53, the pin 59a, and the header 59b are covered by a circular cylinder shaped cap 56 whose top portion is closed off. Furthermore, the IC substrate 54, the igniting agent 53, the pin 59a, and the header 59b that are covered by the cap 56 are formed integrally by being covered by a resin mold 57 that is made to extend across the portions of the pins 59a and 51b using a molding process. Note that, in the above description, the materials used for each portion are merely examples thereof and a variety of modifications can be employed such as, for example, using a cap 56 formed from metal.

As a result, if the ignition element 30 is energized and generates heat so as to ignite the igniting agent 53, the supplemental restraint system is operated and the IC substrate 54 is blown in the direction of the pin 59a and the header 59b of the squib (i.e., in the direction shown by the arrow in FIG. 7) of the squib 2a by the pressure that is generated from the ignited igniting agent 53. As a result, the joining portion 61a that connects the IC substrate 54 with the pin 59a is cut under the principle of the IC substrate 54 acting as a guillotine at the portion along the line C-C in FIG. 7. Accordingly, because the connection between the pin 59a that is connected to the bus 3 and the IC substrate 54 is cut, even if the IC substrate 54 is damaged by the pressure or heat that is generated from the ignited igniting agent 53, it is possible to prevent any electrical effects from being generated on the bus wire 3 side that had been connected to the IC substrate 54.

As a result, if the ignition element 30 is energized and generates heat so as to ignite the igniting agent 53, the supplemental restraint system is operated and the IC substrate 54 is blown in the direction of the pin 59a and the header 59b of the squib (i.e., in the Y direction shown in FIG. 7) of the squib 2a by the pressure that is generated from the ignited igniting agent 53. As a result, the joining portion 61a that connects the IC substrate 54 with the pin 59a is cut under the principle of the IC substrate 54 acting as a guillotine at the portion along the line C-C in FIG. 7. Accordingly, because the connection between the pin 59a that is connected to the bus 3 and the IC substrate 54 is cut, even if the IC substrate 54 is damaged by the pressure or heat that is generated from the ignited igniting agent 53, it is possible to prevent any electrical effects from being generated on the bus wire 3 side that had been connected to the IC substrate 54.

As has been described above, according to the squib of the present embodiment, in the same way as in the first and second embodiments, when a supplemental restraint system is operated by igniting an igniting agent 53, because the connection between the bus wire 3 and the IC substrate 54 is broken, even if the IC substrate 54 is damaged by the pressure or heat that is generated from the ignited igniting agent 53, it is possible to prevent any electrical effects from being generated in the bus wire 3 that had been connected to the IC substrate 54.

Accordingly, a squib that is provided in the supplemental restraint system being operated does not electrically affect the bus wire 3, which supplies power and control signals. Consequently, the effect is obtained that it is possible to achieve a squib that further improves the reliability of the bus wire 3.

What is claimed is:

1. A squib for an occupant protection apparatus that, based on an ignition command signal received from an external signal line, ignites an explosive so as to cause a supplemental restraint system to be operated, the squib comprising:
    an ignition device that ignites the explosive;
    a communication/ignition control section that receives the ignition command signal, and that controls an igniting of the explosive by the ignition device; and
    a connecting terminal that connects the communication/ignition control section to the external signal line, wherein
    when the explosive is being ignited by the ignition device, the communication/ignition control section is entirely separated from the connecting terminal by at least one of pressure and heat generated from the explosive.

2. The squib according to claim 1, further including a joining portion disposed between said communication/ignition control section and said connecting terminal, and said joining portion is destroyed by said at least one of pressure and heat generated from the ignited explosive, thereby separating said communicationlignition control section and said connecting terminal.

3. The squib according to claim 2, wherein said communication/ignition control section includes an integrated circuit substrate (IC substrate), said IC substrate is forcibly moved by pressure generated from the explosive being ignited, thereby breaking the joining portion to separate the communication/ignition control section from the connecting terminal.

4. The squib according to claim 1, wherein the communication/ignition control section is electrically disconnected from the connecting terminal by said at least one of pressure and heat generated from the ignited explosive.

5. The squib according to claim 1, wherein said communication/ignition control section includes an integrated circuit substrate (IC substrate), said IC substrate is forcibly moved by pressure generated from the explosive being ignited.

6. The squib according to claim 3, wherein said IC substrate is forcibly moved away from the connecting terminal by pressure generated from the explosive being ignited.

7. The squib according to claim 5, wherein said IC substrate is forcibly moved toward the connecting terminal by pressure generated from the explosive being ignited.

8. The squib according to claim 1, wherein said connecting terminal is formed of melting material.

9. A squib for an occupant protection apparatus that, based on an ignition command signal received from an external signal line, ignites so as to cause a supplemental restraint system to be operated, the squib comprising:
  an explosive;
  an ignition device that ignites the explosive;
  a control section that receives the ignition command signal, and that controls an igniting of the explosive by the ignition device; and
  a connecting terminal that connects the control section to the external signal line, wherein
  when the explosive is being ignited by the ignition device, the control section is entirely separated from the connecting terminal by at least one of pressure and heat generated from the explosive.

10. The squib according to claim 9, further including a joining portion disposed between said control section and said connecting terminal, and said joining portion is destroyed by said at least one of pressure and heat generated from the ignited explosive, thereby separating said control section and said connecting terminal.

11. The squib according to claim 10, wherein said control section includes an integrated circuit substrate (IC substrate), said IC substrate is forcibly moved by pressure generated from the explosive being ignited, thereby breaking the joining portion to separate the control section from the connecting terminal.

12. The squib according to claim 9, wherein the control section is electrically disconnected from the connecting terminal by said at least one of pressure and heat generated from the ignited explosive.

13. The squib according to claim 9, wherein said control section includes an integrated circuit substrate (IC substrate), said IC substrate is forcibly moved by pressure generated from the explosive being ignited.

14. The squib according to claim 13, wherein said IC substrate is forcibly moved away from the connecting terminal by pressure generated from the explosive being ignited.

15. The squib according to claim 13, wherein said IC substrate is forcibly moved toward the connecting terminal by pressure generated from the explosive being ignited.

16. The squib according to claim 9, wherein said connecting terminal is formed of melting material.

17. The squib according to claim 9, further comprising a cap having a closed end and in which said explosive, ignition device and control section are disposed.

18. A squib for an occupant protection apparatus that, based on an ignition command signal received from an external signal line, ignites an igniting agent so as to cause a supplemental restraint system to be operated, the squib comprising:
  a cap having an open end and a closed end;
  a header disposed at the open end of the cap so as to seal the open end thereof;
  a control section formed on a substrate disposed towards the closed end of the cap;
  an ignition element operatively connected to the control unit;
  an igniting agent disposed between the control section and the header; and
  a connecting terminal that connects the control section to the external signal line; wherein
  the control section receives the ignition command signal from the external signal line and controls the ignition element which ignites the igniting agent; and
  when the igniting agent is being ignited by the ignition element, the control section is electrically disconnected from the connecting terminal by at least one of pressure and heat generated from the igniting agent.

19. The squib according to claim 18, further comprising a joining portion disposed between said control section and said connecting terminal, wherein said joining portion is destroyed by said at least one of pressure and heat generated from the igniting agent, thereby separating said control section and said connecting terminal.

20. The squib according to claim 19, wherein the header includes at least one opening formed therein permitting electrical connection between the joining portion and the connecting terminal.

* * * * *